United States Patent
Marsico (10) Patent No.: US 7,787,445 B2
(45) Date of Patent: Aug. 31, 2010

(54) METHODS, SYSTEMS, AND COMPUTER PROGRAM PRODUCTS FOR ROUTING AND PROCESSING ENUM QUERIES

(75) Inventor: Peter J. Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 0 days.

(21) Appl. No.: 11/879,737

(22) Filed: Jul. 18, 2007

(65) Prior Publication Data
US 2008/0019356 A1    Jan. 24, 2008

Related U.S. Application Data

(60) Provisional application No. 60/832,084, filed on Jul. 20, 2006.

(51) Int. Cl.
*H04L 12/66* (2006.01)
*H04L 12/28* (2006.01)
*H04L 12/56* (2006.01)

(52) U.S. Cl. .................... 370/352; 370/353; 370/395.2

(58) Field of Classification Search ............... 370/352, 370/395.2; 379/196, 265.01, 218.01, 201.01
See application file for complete search history.

(56) References Cited

U.S. PATENT DOCUMENTS

| | | | |
|---|---|---|---|
| 4,310,727 A | 1/1982 | Lawser | |
| 4,754,479 A | 6/1988 | Bicknell et al. | |
| 4,819,156 A | 4/1989 | DeLorme et al. | |
| 5,089,954 A | 2/1992 | Rago | |
| 5,237,604 A | 8/1993 | Ryan | |
| 5,247,571 A | 9/1993 | Kay et al. | |
| 5,251,248 A | 10/1993 | Tokunaga et al. | |
| 5,400,390 A | 3/1995 | Salin | |
| 5,422,941 A | 6/1995 | Hasenauer et al. | |
| 5,423,068 A | 6/1995 | Hecker | |
| 5,430,719 A | 7/1995 | Weisser, Jr. | |
| 5,442,683 A | 8/1995 | Hoogeveen | |
| 5,455,855 A | 10/1995 | Hokari | |

(Continued)

FOREIGN PATENT DOCUMENTS

EP    0 512 962 A2    11/1992

(Continued)

OTHER PUBLICATIONS

Commonly-assigned, co-pending U.S. Appl. No. 11/605,837 for "Methods, Systems and Computer Program Products for Accessing Number Portability (NP) and E.164 Number (ENUM) Data Using a Common NP/Enum Data Locator Structure," (Unpublished, filed Nov. 29, 2006).

(Continued)

*Primary Examiner*—Thjuan K Addy
(74) *Attorney, Agent, or Firm*—Jenkins, Wilson, Taylor & Hunt, P.A.

(57) ABSTRACT

The subject matter described herein includes methods, systems, and computer program products for routing ENUM queries to an ENUM database. According to one aspect, the subject matter described herein includes a method for routing ENUM queries to an ENUM database. The method includes receiving an ENUM query including a subscriber identifier. An ENUM database is identified among a plurality of non-identically provisioned ENUM databases based on the subscriber identifier. The ENUM query is routed to the identified ENUM database.

20 Claims, 5 Drawing Sheets

U.S. PATENT DOCUMENTS

| | | |
|---|---|---|
| 5,457,736 A | 10/1995 | Cain et al. |
| 5,481,603 A | 1/1996 | Gutierrez et al. |
| 5,502,726 A | 3/1996 | Fischer |
| 5,504,804 A | 4/1996 | Widmark et al. |
| 5,526,400 A | 6/1996 | Nguyen |
| 5,579,372 A | 11/1996 | Åström |
| 5,590,398 A | 12/1996 | Matthews |
| 5,594,942 A | 1/1997 | Antic et al. |
| 5,623,532 A | 4/1997 | Houde et al. |
| 5,689,548 A | 11/1997 | Maupin et al. |
| 5,706,286 A | 1/1998 | Reiman et al. |
| 5,711,002 A | 1/1998 | Foti |
| 5,819,178 A | 10/1998 | Cropper |
| 5,822,694 A | 10/1998 | Coombes et al. |
| 5,832,382 A | 11/1998 | Alperovich |
| 5,854,982 A | 12/1998 | Chambers et al. |
| 5,878,347 A | 3/1999 | Joensuu et al. |
| 5,890,063 A | 3/1999 | Mills |
| 5,953,662 A | 9/1999 | Lindquist et al. |
| 5,953,663 A | 9/1999 | Maupin et al. |
| 5,983,217 A | 11/1999 | Khosravi-Sichani et al. |
| 6,006,098 A | 12/1999 | Rathnasabapathy et al. |
| 6,011,803 A | 1/2000 | Bicknell et al. |
| 6,014,557 A | 1/2000 | Morton et al. |
| 6,018,657 A | 1/2000 | Kennedy, III et al. |
| 6,038,456 A | 3/2000 | Colby et al. |
| 6,049,714 A | 4/2000 | Patel |
| 6,097,960 A | 8/2000 | Rathnasabapathy et al. |
| 6,115,463 A | 9/2000 | Coulombe et al. |
| H1895 H | 10/2000 | Hoffpauir et al. |
| 6,128,377 A | 10/2000 | Sonnenberg |
| 6,137,806 A | 10/2000 | Martinez |
| 6,138,016 A | 10/2000 | Kulkarni et al. |
| 6,138,017 A | 10/2000 | Price et al. |
| 6,138,023 A | 10/2000 | Agarwal et al. |
| 6,144,857 A | 11/2000 | Price et al. |
| 6,148,204 A | 11/2000 | Urs et al. |
| 6,192,242 B1 | 2/2001 | Rollender |
| 6,205,210 B1 | 3/2001 | Rainey et al. |
| 6,226,517 B1 | 5/2001 | Britt et al. |
| 6,236,365 B1 | 5/2001 | LeBlanc et al. |
| 6,263,212 B1 | 7/2001 | Ross et al. |
| 6,308,075 B1 | 10/2001 | Irten et al. |
| 6,327,350 B1 | 12/2001 | Spangler et al. |
| 6,377,674 B1 | 4/2002 | Chong et al. |
| 6,411,632 B2 | 6/2002 | Lindgren et al. |
| 6,424,832 B1 | 7/2002 | Britt et al. |
| 6,434,144 B1 | 8/2002 | Romanov |
| 6,463,055 B1 | 10/2002 | Lupien et al. |
| 6,505,046 B1 | 1/2003 | Baker |
| 6,515,997 B1 | 2/2003 | Feltner et al. |
| 6,535,746 B1 | 3/2003 | Yu et al. |
| 6,539,077 B1 | 3/2003 | Ranalli et al. |
| 6,560,216 B1 | 5/2003 | McNiff et al. |
| 6,560,456 B1 | 5/2003 | Lohtia et al. |
| 6,574,481 B1 | 6/2003 | Rathnasabapathy et al. |
| 6,577,723 B1 | 6/2003 | Mooney |
| 6,594,258 B1 | 7/2003 | Larson et al. |
| 6,611,516 B1 | 8/2003 | Pirkola et al. |
| 6,643,511 B1 | 11/2003 | Rune et al. |
| 6,662,017 B2 | 12/2003 | McCann et al. |
| 6,683,881 B1 | 1/2004 | Mijares et al. |
| 6,684,073 B1 | 1/2004 | Joss et al. |
| 6,731,926 B1 | 5/2004 | Link, II et al. |
| 6,738,636 B2 | 5/2004 | Lielbriedis |
| 6,748,057 B2 | 6/2004 | Ranalli et al. |
| 6,775,737 B1 | 8/2004 | Warkhede et al. |
| 6,795,701 B1 | 9/2004 | Baker et al. |
| 6,836,477 B1 | 12/2004 | West, Jr. et al. |
| 6,885,872 B2 | 4/2005 | McCann et al. |
| 6,917,612 B2 | 7/2005 | Foti et al. |
| 6,950,441 B1 | 9/2005 | Kaczmarczyk et al. |
| 6,993,038 B2 | 1/2006 | McCann |
| 7,035,239 B2 | 4/2006 | McCann et al. |
| 7,079,524 B2 | 7/2006 | Bantukul et al. |
| 7,079,853 B2 | 7/2006 | Rathnasabapathy et al. |
| 7,085,260 B2 * | 8/2006 | Karaul et al. ............... 370/352 |
| 7,092,505 B2 | 8/2006 | Allison et al. |
| 7,221,952 B2 | 5/2007 | Cho et al. |
| 7,286,839 B2 | 10/2007 | McCann et al. |
| 7,366,530 B2 | 4/2008 | McCann et al. |
| 2001/0008532 A1 | 7/2001 | Lee |
| 2001/0029182 A1 | 10/2001 | McCann et al. |
| 2001/0030957 A1 | 10/2001 | McCann et al. |
| 2001/0040957 A1 | 11/2001 | McCann et al. |
| 2002/0095421 A1 | 7/2002 | Koskas |
| 2002/0147845 A1 | 10/2002 | Sanchez-Herrero et al. |
| 2002/0173320 A1 | 11/2002 | Aitken et al. |
| 2002/0176382 A1 | 11/2002 | Madour et al. |
| 2003/0007482 A1 * | 1/2003 | Khello et al. ............... 370/352 |
| 2003/0026289 A1 | 2/2003 | Mukherjee et al. |
| 2003/0054844 A1 | 3/2003 | Anvekar et al. |
| 2003/0065788 A1 | 4/2003 | Salomaki |
| 2003/0081754 A1 | 5/2003 | Esparza et al. |
| 2003/0109271 A1 | 6/2003 | Lewis et al. |
| 2003/0128693 A1 * | 7/2003 | Segal ......................... 370/352 |
| 2003/0193967 A1 | 10/2003 | Fenton et al. |
| 2003/0220951 A1 | 11/2003 | Muthulingam et al. |
| 2003/0227899 A1 | 12/2003 | McCann |
| 2004/0034699 A1 | 2/2004 | Gotz et al. |
| 2004/0076126 A1 | 4/2004 | Qu et al. |
| 2004/0081206 A1 | 4/2004 | Allison et al. |
| 2004/0082332 A1 | 4/2004 | McCann et al. |
| 2004/0087300 A1 | 5/2004 | Lewis |
| 2004/0142707 A1 | 7/2004 | Midkiff et al. |
| 2004/0198351 A1 | 10/2004 | Knotts |
| 2004/0202187 A1 | 10/2004 | Kelly et al. |
| 2004/0246965 A1 | 12/2004 | Westman et al. |
| 2005/0003838 A1 | 1/2005 | McCann et al. |
| 2005/0101297 A1 | 5/2005 | Delaney et al. |
| 2005/0119017 A1 | 6/2005 | Lovell, Jr. et al. |
| 2005/0251509 A1 | 11/2005 | Pontius |
| 2005/0286531 A1 * | 12/2005 | Tuohino et al. .......... 370/395.2 |
| 2005/0286695 A1 * | 12/2005 | Pershan et al. ............. 379/196 |
| 2006/0067338 A1 | 3/2006 | Hua et al. |
| 2006/0098621 A1 | 5/2006 | Plata et al. |
| 2006/0136557 A1 | 6/2006 | Schaedler et al. |
| 2007/0061397 A1 | 3/2007 | Gregorat et al. |
| 2007/0121879 A1 * | 5/2007 | McGary et al. ........ 379/218.01 |
| 2007/0133574 A1 | 6/2007 | Tejani et al. |
| 2007/0203909 A1 | 8/2007 | Marathe et al. |
| 2007/0286379 A1 | 12/2007 | Wiatrowski et al. |
| 2008/0130856 A1 * | 6/2008 | Ku et al. ................. 379/201.01 |
| 2008/0311917 A1 | 12/2008 | Marathe et al. |
| 2009/0103707 A1 * | 4/2009 | McGary et al. ........ 379/218.01 |
| 2009/0227276 A1 | 9/2009 | Agarwal et al. |

FOREIGN PATENT DOCUMENTS

| | | |
|---|---|---|
| EP | 0 936 825 A3 | 8/1999 |
| EP | 0 944 276 A1 | 9/1999 |
| EP | 1 527 536 | 12/2003 |
| EP | 1 558 004 A | 7/2005 |
| WO | WO 95/12292 A1 | 5/1995 |
| WO | WO 96/11557 | 4/1996 |
| WO | WO 97/33441 A1 | 9/1997 |
| WO | WO 98/56195 | 12/1998 |
| WO | WO 99/11087 A2 | 3/1999 |
| WO | WO 99/57926 | 11/1999 |
| WO | WO 00/16583 A1 | 3/2000 |
| WO | WO 00/60821 | 10/2000 |
| WO | WO 01/47297 A2 | 6/2001 |
| WO | WO 01/48981 A1 | 7/2001 |
| WO | WO 01/54444 A1 | 7/2001 |

| | | |
|---|---|---|
| WO | WO 03/005664 A2 | 1/2003 |
| WO | WO 03/021982 A1 | 3/2003 |
| WO | WO 03/105382 A1 | 12/2003 |
| WO | WO 2004/006534 | 1/2004 |
| WO | WO 2004/087686 A | 1/2004 |
| WO | WO 2004/075507 | 9/2004 |
| WO | WO 2004/102345 A2 | 11/2004 |
| WO | WO 2005/013538 A3 | 2/2005 |
| WO | WO 2007/045991 A1 | 4/2007 |
| WO | WO 2007/064943 A2 | 6/2007 |
| WO | WO 2007/092205 A2 | 8/2007 |
| WO | WO 2007/146257 A2 | 12/2007 |
| WO | WO 2008/157213 A2 | 12/2008 |

OTHER PUBLICATIONS

Notification of Transmittal of the International Search Report and the Written Opinion of the International Searching Authority, or the Declaration for International Application No. PCT/US07/16370 (Sep. 15, 2008).
Notification Concerning Transmittal of International Preliminary Report on Patentability for Internation Application No. PCT/US2007/002520 (Aug. 21, 2008).
Notification of Transmittal of the International Search Report and the Written Opinion of the International Searching Authority, or the Declaration for Internation Application No. PCT/US07/02520 (Mar. 3, 2008).
Notification of Transmittal of the International Search Report and Writtent Opinion of the International Searching Authority, or the Declaration for International Application No. PCT/US07/13732 (Jan. 29, 2008).
Official Action for U.S. Appl. No. 11/364,759 (Mar. 30, 2009).
Final Official Action for U.S. Appl. No. 11/291,502 (Feb. 4, 2010).
Final Official Action for U.S. Appl. No. 11/364,759 (Jan. 21, 2010).
Supplementary European Search Report for European application No. 07810606.9 (Nov. 23, 2009).
Supplementary European Search Report for European Patent No. 1676386 (Oct. 30, 2009).
Notification of Transmittal of the International Search Report and The Written Opinion of the International Searching Authority, or the Declaration for International application No. PCT/US2009/036538 (Sep. 30, 2009).
Supplementary European Search Report for European application No. 04751843.6 (Aug. 7, 2009).
Communication pursuant to Article 94(3) EPC for European application No. 06844747.3 (Jul. 28, 2009).
Official Action for U.S. Appl. No. 11/291,502 (May 13, 2009).
Supplementary European Search Report for European Application No. 06844747.3 (Apr. 24, 2009).
Notification of Transmittal of the International Search Report and the Written Opinion of the International Searching Authority, or the Declaration for International Application No. PCT/US2008/072641 (Feb. 24, 2009).
Notification of Transmittal of the International Search Report and the Written Opinion of the International Searching Authority, or the Declaration for International Application No. PCT/US2008/066675 (Dec. 9, 2008).
Notification Concerning Transmittal of International Preliminary Report on Patentability for International Application No. PCT/US2006/046108 (Oct. 2, 2008).
Notification of Transmittal of the International Search Report and the Written Opinion of the International Searching Authority, or the Declaration for International Application No. PCT/US2006/046108 (Sep. 9, 2008).
Communication of European publication number and information on the application of Article 67(3) EPC for Application No. 06844747.3 (Jul. 23, 2008).
Notice of Allowance and Fee(s) Due for U.S. Appl. No. 11/112,126 (Mar. 28, 2008).
Notice of Allowance and Fee(s) Due for U.S. Appl. No. 11/112,126 (Dec. 17, 2007).
Notice of Allowance for U.S. Appl. No. 10/729,519 (Jul. 30, 2007).
Official Action for U.S. Appl. No. 11/112,126 (Jun. 15, 2007).

"IP Multimedia Subsystem," printout from wikipedia.org, Wikimedia Foundation, Inc. (May 29, 2007).
Official Action for U.S. Appl. No. 10/729,519 (Nov. 28, 2006).
Notification Concerning Transmittal of International Preliminary Report on Patentability for International Application No. PCT/US2004/024328 (Jul. 20, 2006).
"HP OperCall Home Subscriber Server Software—Data Sheet", 4AA0-3360ENW Rev. 2, Hewlett-Packard Development Company, L.P. (Jul. 2006).
Notice of Allowance for U.S. Appl. No. 10/631,586 (May 25, 2006).
Notification of Transmittal of the International Search Report, or the Declaration and Written Opinion of the International Searching Authority for International Application No. PCT/US2004/024328 (Apr. 25, 2006).
Supplemental Notice of Allowance for U.S. Appl. No. 09/747,070 (Feb. 10, 2006).
Communication pursuant to Rules 109 and 110 EPC for European Application No. 04751843.6 (Dec. 16, 2005).
Notice of Allowance for U.S. Appl. No. 09/747,070 (Dec. 2, 2005).
Interview Summary for U.S. Appl. No. 09/747,070 (Dec. 2, 2005).
Notification Concerning Transmittal of International Preliminary Report on Patentability (Chapter I of the Patent Cooperation Treaty) in International Application No. PCT/US2004/014645 (Nov. 24, 2005).
Advisory Action for U.S. Appl. No. 09/747,070 (Nov. 1, 2005).
Official Action for U.S. Appl. No. 10/631,586 (Oct. 26, 2005).
Notice of Allowance for U.S. Appl. No. 10/166,968 (Sep. 20, 2005).
Supplemental Notice of Allowance and Fee(s) Due for U.S. Appl. No. 10/842,394 (Feb. 9, 2005).
Notification of Transmittal of the International Search Report and the Written Opinion of the International Searching Authority, or the Declaration for International Application No. PCT/US2004/014645 (Dec. 16, 2004).
Notice of Allowance and Fee(s) Due for U.S. Appl. No. 10/842,394 (Dec. 15, 2004).
Notification of Transmittal of the International Search Report and the Written Opinion of the International Searching Authority, or the Declaration for International Application No. PCT/US04/06247 (Nov. 10, 2004).
Notice of Allowance for U.S. Appl. No. 09/471,946 (Oct. 15, 2004).
Final Official Action for U.S. Appl. No. 09/747,070 (May 11, 2005).
Official Action for U.S. Appl. No. 09/747,070 (Jun. 30, 2004).
Supplemental Notice of Allowability for U.S. Appl. No. 09/471,946 (May 24, 2004).
"Cisco IP Transfer Point as the Signaling Gateway for the Cisco BTS 10200 Softswitch," Cisco Systems, Inc., pp. 1-10 (Summer 2004).
"Cisco IP Transfer Point as the Signaling Gateway for the Cisco PGW 2200 Softswitch," Cisco Systems, Inc., pp. 1-11 (Summer 2004).
"Next-Generation Signaling Transports Cisco IP Transfer Point," Cisco Systems, Inc., pp. 1-27 (Summer 2004).
"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).
Notice of Allowance and Fee(s) Due for U.S. Appl. No. 09/471,946 (Feb. 6, 2004).
Walker, "The IP Revolution in Mobile Messaging," Packet, Cisco Systems Users Magazine, vol. 16, No. 1, pp. Cover; 73-74; and 89 (First Quarter 2004).
"Cisco IPT Multilayer Routing (MLR) SMS MO Routing Requirements," Cisco Systems, Inc., p. 1 (Copyright 2004).
"Cisco Signaling, Gateway Manager Release 3.2 For Cisco IP Transfer Point," Cisco Systems, Inc., pp. 1-9 (Copyright 1992-2004).
"Solutions for Mobile Network Operators," Cisco Systems, Inc., pp. 1-8 (Copyright 1992-2004).
Official Action from European Patent Office in courterpart European Patent Application (Dec. 11, 2003).
Interview Summary for U.S. Appl. No. 09/471,946 (Dec. 9, 2003).
Communication pursuant to Article 96(2) EPC for European Application No. 00988270.5 (Nov. 12, 2003).
Notification of Transmittal of the International Search Report or the Declaration for International Application No. PCT/US2003/018266 (Oct. 31, 2003).

Office Communication for U.S. Appl. No. 09/759,743 (Oct. 20, 2003).
Official Action for U.S. Appl. No. 09/471,946 (Jul. 9, 2003).
Moodie, "Agilent acceSS7: White Paper," Agilent Technologies, pp. 1-14 (Apr. 1, 2003).
Notice of Allowance and Fee(s) Due for U.S. Appl. No. 09/759,743 (Mar. 10, 2003).
Interview Summary for U.S. Appl. No. 09/759,743 (Feb. 27, 2003).
"Cisco IP Transfer Point," Cisco Systems, Inc., pp. 1-10 (Copyright 1992-2003).
"Cisco IP Transfer Point Multilayer Short Message Serivce Routing Solution," Cisco Systems, Inc., pp. 1-6 (Copyright 1992-2003).
"Cisco ITP MAP Gateway for Public WLAN Slm Authentication and Authorization," Ciso Systems, Inc., pp. 1-13 (Copyright 1992-2003).
Final Official Action for U.S. Appl. No. 09/759,743 (Dec. 2, 2002).
Barry, "A Signal for Savings," Packet, Cisco Systems Users Magazine, vol. 14, No. 4, pp. Cover; 19-21; and 81 (Fourth Quarter 2002).
Interview Summary for U.S. Appl. No. 09/759,743 (Sep. 13, 2002).
Official Action for U.S. Appl. No. 09/759,743 (May 23, 2002).
Interview Summary for U.S. Appl. No. 09/759,743 (Mar. 6, 2002).
"Agilent Tchnologies and Cisco Systems SS7 Over IP White Paper," Cisco Systems, Inc. and Agilent and Technologies, pp. 1-6 (Copyright 2002-Printed in the UK Feb. 1, 2002).
"Cisco IP Transfer Point: MTP3 User Adaptation (M3UA) and SCCP User Adaptation (SUA) Signaling Gateway," Cisco Systems, Inc., pp. 1-14 (Copyright 2002).
"Cisco SS7 Port Adapter for the Cisco 7500 Versatile Interface Processor and 7200 VXR Routers Provide High-Density SS7 Agrregation," Cisco Systems, Inc., pp. 1-5 (Copyright 1992-2002).
"Next-Generation SS7 Networks with the Cisco IP Transfer Point," Cisco Systems, Inc., pp. 1-14 (Copyright 1992-2002).
Notification of Transmittal of International Preliminary Examination Report for International Application No. PCT/US1999/030861 (Dec. 28, 2001).
Official Action for U.S. Appl. No. 09/759,743 (Dec. 3, 2001).
International Preliminary Examination Report for International Application No. PCT/CS01/01052 (Nov. 7, 2001).
The attached email dated Oct. 20, 2001 and PowerPoint presentation dated Oct. 24, 2001 disclose an MSISDN-based auto-provisioning solution proposed by a customer of the assignee of the presend application.
"Agilent acceSS7 Business intelligence," Agilent Technologies, pp. 1-6 (Copyright 2001-Printed in the UK Nov. 30, 2001).
International Search Report for International Application No. PCT/US00/34924 (May 16, 2001).
"Cisco IP Transfer Point (ITP) Network Management Product Presentation," Cisco Systems, Inc., pp. 1-20 (Copyright 2001).
"Networkers," Cisco Systems, Inc., pp. 1-60 (Copyright 2001).
"Cisco SS7 Signaling Offload," Cisco Systems, Inc., pp. 1-33 (Copyright 1992-2001).
Rockhold, "Or," Wireless Review, p. 22, 23, 26, 28, 30, 32, (Aug. 15, 2000).
Notification of Transmittal of the International Search Report or the Declaration for International Application No. PCT/US1999/030861 (Mar. 17, 2000).
"Topsail Beach-SS7 Over IP-" Cisco Systems, Inc., pp. 1-16 (Copyright 1999).
ETSI, "Digital Cellular Telecommunications Systems (Phase 2+); Support of Mobile Number Portability (MNP); Technical Realisation; Stage 2," Global System for Mobile Communications, p. 1-71, (1998).
Smith, "Number Portability Pileup," Telephony, p. 22, 24, 26, (Jan. 6, 1997).
Jain et al., "Phone Number Portability for PCS Systems with ATM Backbones Using Distributed Dynamic Hashing," IEEE, vol. 15 (No. 1), p. 96-105, (Jan. 1997).
Heinmiller, "Generic Requirements for SCP Application and GTT Function for Number Portability," Illinois Number Portability Workshop, p. 1-50, (Sep. 4, 1996).
International Telecommunication Union, "Series Q: Switching and Signalling: Specifications of Signalling Systems No. 7-Signalling Connection Control Part," p. 11-16, (Jul. 1996).
Rice, "SS7 Networks in a PCS World," Telephony, pp. 138, 140 142, 144, 146, (Jun. 24, 1996).
Tekelec, "Eagle STP Planning Guide", Eagle Network Switching Division, (No. 3), p. i-vii, 1-64, A1-A2, B1-2, (May 1996).
Anonymous, "Generic Switching and Signaling Requirements for Number Portability," AT&T Network Systems, No. 1, p. 1-75, (Feb. 2, 1996).
ETSI, Digital Cellular Telecommunications System (Phase 2+); Milbe Application Part (MAP) Specification, Global System for Mobile Communications, pp. 112-114 (1996).
Jain, et al., "A Hashing Scheme for Phone Number Portability in PCS Systems with ATM Backbones," Bell Communications Research, p. 593-597, (1996).
Bishop, "Freeing the Network for Competition," Telecommunications, p. 75-80, (Apr. 1995).
Anonymous, "Zeichengabesystem-Eine, neue Generation für ISDN und intelligente Netze," Zeichengabesystem, Medien-Institut Bremen, p. iz-xi; 170-176, (Feb. 17, 1995).
Giordano et al., "PCS Number Portability," IEEE, p. 1146-1150, (Sep. 1994).
Bellcore, "Signaling Transfer Point (STP) Generic Requirements," Bell Communications Research, No. 1, p. ii-xxii, 4-84-J14, (Jun. 1994).
Telcordia Technologies, "CCS Network interface Specification (CCSNIS) Supporting SCCP and TCAP,"Bell Communications Research, p. ii-xii, 1-1-C-22, (Mar. 1994).
Buckles, "Very High Capacity Signaling Trnsfer Point for Intelligent Network Servcies," DSC Communciations Corporation, p. 1308-1311, (1988).
"Diameter Overview," referenced from www.ulticom.com/html/products/signalware-diameter-reference-guide.asp (Publication date unknown), Submitted on Apr. 16, 2010.
"Chapter 1: Overview," SS7 Port Adapter Installation and Configuration, pp. 1-1-1-8 (Publication Date Unknown), Submitted on Apr. 16, 2010.
"Configuring ITP Basic Functionally," IP Transfer Point, Cisco IOS Release 12.2(4)MB12, pp. 31-50 (Publication Date Unknown), Submitted on Apr. 16, 2010.
"Configuring ITP Optional Features," IP Transfer Point, Cisco IOS Release 12.294)MB12, pp. 65-136 (Publication Date Unknown), Submitted on Apr. 16, 2010.
"Configuring M3UA and SUA SS7 Over IP Signaling Gateways," IP Transfer Point, Cisco IOS Release 12.2(4)MB13, pp. 51-66 (Publication Date Unknown), Submitted on Apr. 16, 2010.
"Configuring M3UA and SUA SS7 Over IP Signaling Gateways," IP Transfer Point, Cisco IOS Release 12.2(4)MB10, pp. 49-62 (Publication Date Unknown), Submitted on Apr. 16, 2010.

* cited by examiner

METHODS, SYSTEMS, AND COMPUTER PROGRAM PRODUCTS FOR ROUTING AND PROCESSING ENUM QUERIES

RELATED APPLICATIONS

This application claims the benefit of U.S. Provisional Patent Application Ser. No. 60/832,084 filed Jul. 20, 2006; the disclosure of which is incorporated herein by reference in its entirety.

TECHNICAL FIELD

The subject matter described herein relates to ENUM queries. More specifically, the subject matter relates to methods, systems, and computer program products for routing and processing ENUM queries.

BACKGROUND

E.164 number mapping (ENUM) refers to the translation of E.164-formatted telephone numbers into uniform resource indicators (URIs) resolvable by a domain name system (DNS) server into Internet protocol (IP) addresses. ENUM has been extensively deployed worldwide in order to provide integration between IP networks, such as the Internet, and the public switched telephone network (PSTN). In one proposal, as described in RFC 2916, the telephone number format used in ENUM translation is the E.164 number format. According to ITU-T standards, an E.164 telephone number may include up to 15 digits and include a leading + symbol indicating that the number is globally unique. For example, a valid E.164 telephone number may include +420-123456789. ENUM translation of an E.164 number into an IP network identifier may include formulating an ENUM query including the E.164 number and querying an ENUM database containing one or more naming authority pointer (NAPTR) records that associate individual E.164 numbers with one or more IP network identifiers. A NAPTR record is a type of DNS record that supports regular-expression-based rewriting, where each network identifier within the NAPTR record may be differentiated based on a variety of parameters. Thus, a NAPTR record may contain multiple URIs associated with a single telephone number, where each URI may be differentiated based on an order, a preference, and a service. For example, the E.164 telephone number +420-123456789 may be associated with SIP URI smith@domain.org, H.323 URI smith@domain.org, and email URI smith@domain.org within a NAPTR record located in an ENUM database.

Upon receiving an ENUM query, the ENUM database may locate and return the NAPTR record associated with the telephone number included in the query. Additional translations may be required in order to select a particular network identifier from within the provided NAPTR record to first attempt to connect to. Typically, ENUM queries are processed by an ENUM database located near the query originator in order to reduce the response time for an ENUM response. Therefore, conventionally, multiple identically provisioned ENUM databases may be distributed throughout a particular geographic area such that each database is capable of responding to an ENUM query associated with any subscriber within the network.

One problem with some conventional ENUM systems is that all ENUM databases contain a complete set of ENUM data associated with all subscribers in the network. Yet as more subscribers and services are added to existing networks, including text and multimedia messaging services, voice over IP (VoIP), and other Internet multimedia subsystem (IMS) services, the volume of ENUM data stored in each of these ENUM databases increases correspondingly. As the volume of ENUM data increases, it becomes increasingly difficult to maintain all ENUM data within a single ENUM database.

In ENUM database systems where multiple identically provisioned databases serve a network, routing is simple because queries can be sent to any of the databases for translations. For example, queries may be load shared among identically provisioned ENUM databases.

In some instances, ENUM databases that serve a network may not be identically provisioned. For example, when an operator's existing ENUM database becomes maximally utilized, the operator may desire to bring a new ENUM database into service and move a portion of the subscriber data from the old ENUM database to the new ENUM database. As a result of moving the portion of the subscriber data to the new ENUM database, the new and old ENUM databases do not contain identical sets of subscribers ENUM data. Consequently, switches that formulate ENUM queries must be provisioned with location information that identifies the ENUM database that holds a particular subscriber's data. Requiring switches to be reprovisioned with ENUM database location information for each subscriber is labor intensive, especially in networks with a large number of existing switches. Such reprovisioning can be required any time the service provider desires to move subscriber ENUM data among ENUM databases. As a result, there exists a need for improved methods, systems, and computer program products for routing and processing ENUM queries.

SUMMARY

The subject matter described herein includes methods, systems, and computer program products for routing ENUM queries to an ENUM database. According to one aspect, the subject matter described herein includes a method for routing ENUM queries to an ENUM database. The method includes receiving an ENUM query including a subscriber identifier. An ENUM database is identified among a plurality of non-identically provisioned ENUM databases based on the subscriber identifier. The ENUM query is routed to the identified ENUM database.

According to another aspect, the subject matter described herein includes a flexible ENUM routing node for routing ENUM queries to an ENUM database. The flexible ENUM routing node includes a communications module for receiving an ENUM query including a subscriber identifier and an E.164-to-ENUM database identifier mapping data structure for associating one or more subscriber identifiers with one or more ENUM database identifiers. The flexible ENUM routing node further includes an ENUM database identifier function for identifying, based on the subscriber identifier and using the E.164-to-ENUM database identifier mapping data structure, an ENUM database from a plurality of non-identically provisioned ENUM databases, and for routing the ENUM query to the identified ENUM database.

The subject matter described herein may be implemented using a computer program product comprising computer executable instructions embodied in a computer readable medium. Exemplary computer readable media suitable for implementing the subject matter described herein include chip memory devices, disc memory devices, application specific integrated circuits, and programmable logic devices. In addition, a computer program product that implements a subject matter described herein may reside on a single device or computing platform or maybe distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
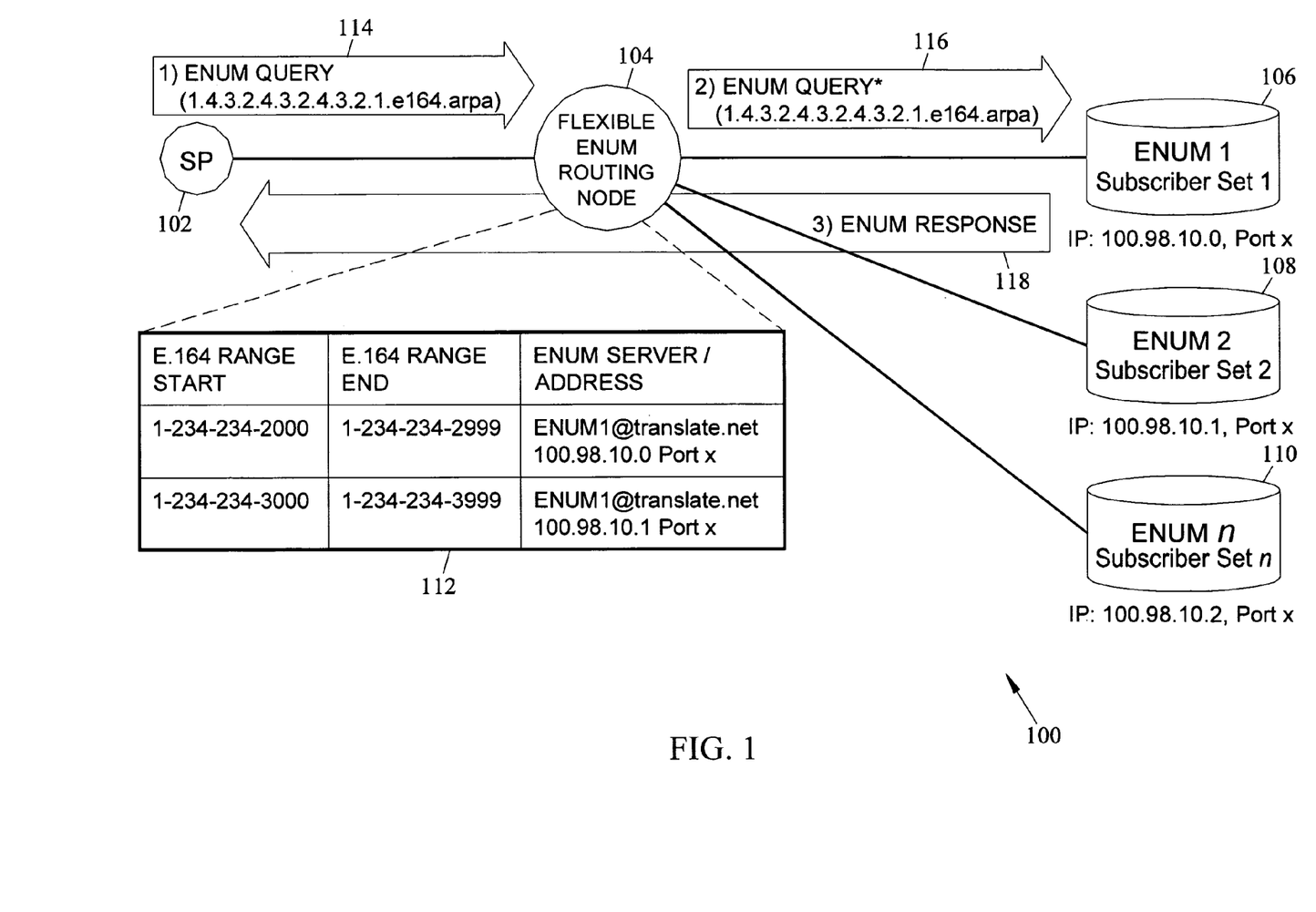
FIG. 1 is a network diagram of an exemplary system for routing ENUM queries to an ENUM database including a range-based E.164-to-ENUM database identifier mapping data structure according to an embodiment of the subject matter described herein.

The subject matter described herein includes methods, systems, and computer program products for routing and processing ENUM queries. FIG. 1 is a network diagram of an exemplary system for routing ENUM queries to an ENUM database. In FIG. 1, the system includes a range-based E.164-to-ENUM database identifier mapping data structure. Referring to FIG. 1, network 100 may include a signaling point (SP) 102, a flexible ENUM routing node 104, and ENUM databases 106, 108 and 110. SP 102 may be connected to flexible ENUM routing node 104 via a communications link, such as a signaling system number 7 (SS7) communications link, an IP communications link, or an SS7-over-IP communications link, for communicating signaling messages, such as ENUM query and response messages, with flexible ENUM routing node 104. Similarly, flexible ENUM routing node 104 may be connected to ENUM databases 106-110 via one or more suitable communications links for sending and receiving ENUM query messages and ENUM response messages with ENUM databases 106-110.

SP 102 may be any suitable network element for generating and/or transmitting ENUM queries within network 100 according to the subject matter described herein. For example, SP 102 may include be a mobile switching center (MSC), a media gateway controller (MGC), a session initiation protocol (SIP) proxy server, an H.323 gatekeeper, an IP multimedia subsystem (IMS) node, or other suitable node for generating ENUM queries.

ENUM data may be distributed across ENUM databases 106-110, where, in one example, each ENUM database 106-110 may contain a subset of the ENUM data associated with subscribers within network 100. For example, ENUM database 106 may contain ENUM data associated with a first set of subscribers, ENUM database 108 may contain ENUM data associated with a second set of subscribers, and ENUM database 110 may contain ENUM data associated with a third set of subscribers. Therefore, collectively, ENUM databases 106-110 contain a complete set of ENUM data associated with subscribers in network 100. In another example, ENUM databases 106-110 may include some overlapping data.

Within network 100, ENUM databases 106-110 may be identified by one or more network identifiers. In the embodiment illustrated in FIG. 1, ENUM databases 106-110 may be identified by network identifiers including a uniform resource indicator and a combination of an IP address and a port number. For example, ENUM database 106 may be identified within network 100 by ENUM1@translate.net and 100.98.10.0/port x, where port x indicates any suitable port value selected from all available ports and conforming to conventional port numbering rules so as not to conflict with other services operating on ENUM database 106. ENUM databases 108 and 110 may be similarly identified by URIs ENUM2@translate.net and ENUMn@tranlsate.net and IP addresses/port numbers 100.98.10.1/port x and 100.98.10.2/port x, respectively. It is appreciated that in addition to the network identifiers described above, other identifiers may be used for identifying ENUM databases 106-110 within network 100 without departing from the scope of the subject matter described herein.

In FIG. 1, ENUM queries including a subscriber identifier, such as an E.164 number, may be generated by SP 102 and transmitted to flexible ENUM routing node 104. ENUM queries may be received by flexible ENUM routing node 104 and a lookup may be performed to determine the appropriate ENUM database from among ENUM databases 106-110 to process the query. For example, flexible ENUM routing node 104 may include E.164-to-ENUM database identifier mapping data structure 112 for associating ranges of E.164 telephone numbers with ENUM database URIs and IP address/port combinations. Referring to table 112, E.164 numbers 1-234-234-2000 through 1-234-234-2999 are associated with ENUM1@translate.net and 100.98.10.0/port x, and E.164 numbers 1-234-234-3000 through 1-234-234-3999 are associated with ENUM2@translate.net and 100.98.10.1/port x. A lookup may be performed using table 112 based on a received E.164 address by locating a row in table 112 where the searched number may be located between the values of the E.164 numbers located in the first and second columns. In addition to the data structure illustrated in FIG. 1, it is appreciated that E.164-to-ENUM database identifier mapping data structure 112 may include other data structures, including a database, a flat file, a list, an array, and a binary tree, without departing from the scope of the subject matter described herein. Table 112 may be located in computer readable medium, such as random access memory (RAM), or any other suitable means according to the subject matter described herein.

In the example illustrated in FIG. 1, ENUM query 114 may be received by flexible ENUM routing node 104, where ENUM query 114 includes the address 1.4.3.2.4.3.2.4.3.2.1.e164.arpa corresponding to E.164 telephone number 1-234-234-2341. It is appreciated that in other embodiments, ENUM query 114 may be addressed to flexible ENUM routing node 104 or may be addressed to one of ENUM databases 106-110. Therefore, flexible ENUM routing node 104 may be configured to receive ENUM queries addressed to it directly, or may intercept ENUM queries addressed to one of ENUM databases 106-110.

Upon receiving ENUM query 114, flexible ENUM routing node 104 may perform a lookup in E.164-to-ENUM database identifier mapping data structure 112 as described above to locate a URI or an IP address/port number associated with one of ENUM databases 106-110. In this example, a lookup performed may result in determining that 1-234-234-2341 is within the range indicated by the first row of table 112, and therefore, network address information corresponding to ENUM database 106 is returned. For example, flexible ENUM routing node 104 may locate URI ENUM1@translate.net and IP address/port number 100.98.10.0/port x and modify ENUM query 118 to include the determined ENUM database address.

In one embodiment, flexible ENUM routing node 104 may modify ENUM query 114 to include the ENUM database address determined in the lookup and route the query to the determined ENUM database, as indicated by modified ENUM query 116 illustrated in FIG. 1. Modified ENUM query 116 may be delivered to ENUM database 106 for processing. In another embodiment, flexible ENUM routing node 104 may forward unmodified ENUM query 114 to one of ENUM databases 106-110 identified in the lookup in table 112. It is appreciated that an intermediate DNS query may be generated by flexible ENUM routing node 104 to obtain an IP address and port number for modifying and delivering ENUM query 114 to ENUM database 106 as described above if, for example, a URI is returned as the result of a lookup in E.164-to-ENUM database identifier mapping data structure.

Upon receiving modified ENUM query 116, ENUM database 106 may locate a NAPTR record associated with the subscriber identifier included in query 114 and generate ENUM response 118. ENUM response 118 may be sent directly to SP 102 in one embodiment or, alternately, may be routed to SP 102 via flexible ENUM routing node 104.

Figure 2:
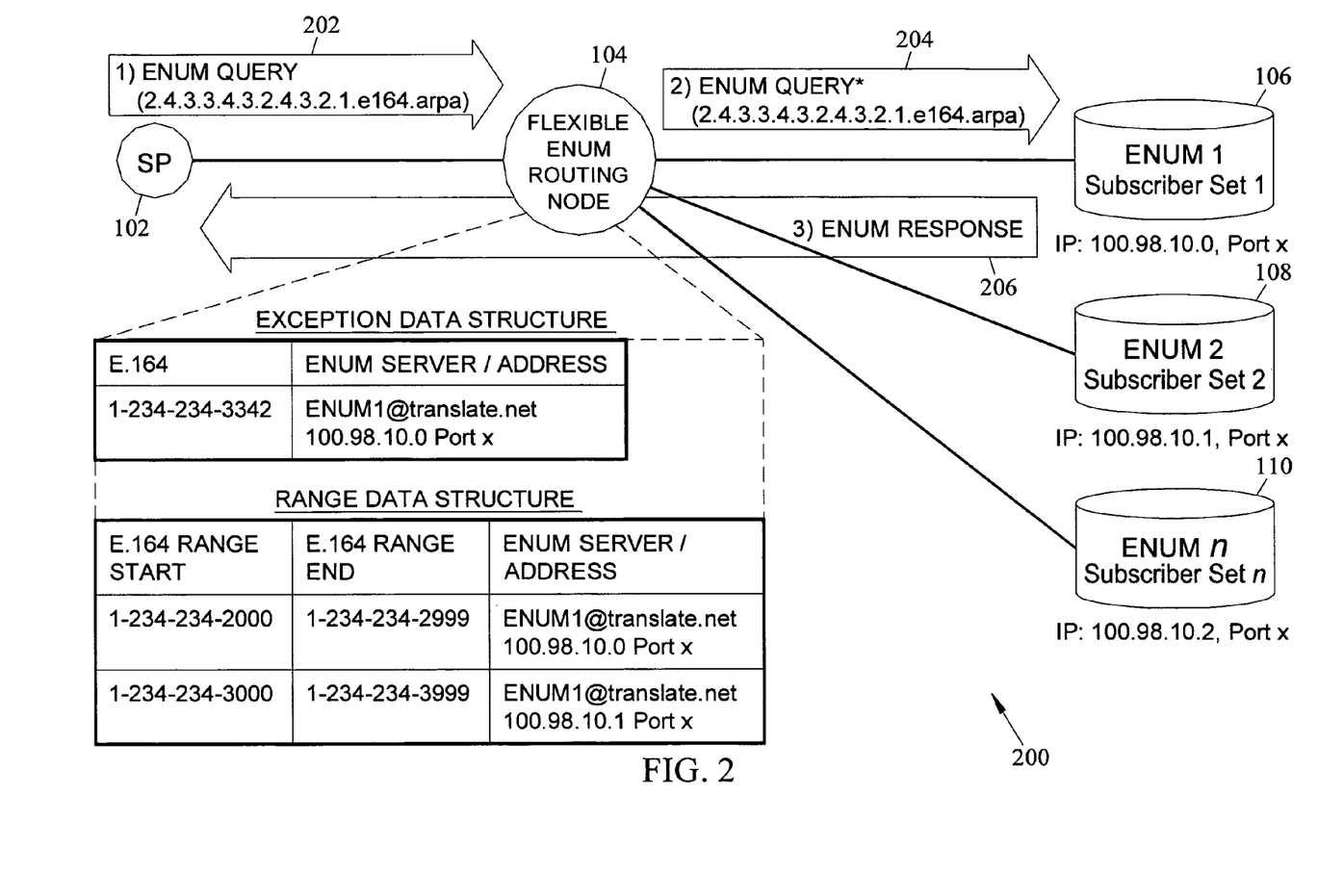
FIG. 2 is a network diagram of an exemplary system for routing ENUM queries to an ENUM database including a combination range-based and exception-based E.164-to-ENUM database identifier mapping data structure according to an embodiment of the subject matter described herein.

FIG. 2 is a network diagram of an exemplary system for routing ENUM queries to an ENUM database. In FIG. 2, the system includes a range-based data structure and an exception-based data structure for identifying an ENUM database. In contrast to the embodiment shown in FIG. 1, ENUM routing table 112 shown in FIG. 2 includes an exception-based data structure in addition to a range-based data structure. As used herein, a range-based data structure is a data structure in which entries are indexed by ranges of subscriber identifiers. For example, each entry in range based data structure 200 illustrated in FIG. 2 is indexed by a range of E.164 numbers. As used herein, an exception-based data structure is a data structure whose entries are indexed by individual subscriber identifiers that are exceptions to the ranges by which the entries in the range-based data structure are indexed. An exception may be a subscriber that is within one of the ranges in the range-based data structure but specifies a different ENUM server or an entry that is outside of all the ranges in the range-based data structure. For example, the entry in exception-based data structure 201 indexed by the individual E.164 number 1234-234-3342 is within the range corresponding to the second entry in range data structure 200. However, the entry in exception data structure 201 returns the ENUM server ENUM 1 while the range-based entry in data structure 202 returns the ENUM server ENUM 2. It may be desirable to provision an individual number that is an exception to a range of numbers, for example, when moving subscriber identifiers among ENUM databases for load balancing purposes or when new databases are brought into service. Because such numbers can be reallocated among the databases and the routing information needs only to be changed at flexible routing node 104, efficiency is achieved over implementations where each individual query originator, such as SP 102 needs to be modified with the new ENUM database information. Another example of an exception-based entry may occur when a subscriber is ported-in to a service provider's network. When the subscriber is ported in and maintains the same E.164 number, the subscriber's ENUM translation information may be assigned to one of the new service provider's ENUM databases, even though the E.164 number of the subscriber is outside of all the ranges of subscriber identifiers corresponding to the service provider's ENUM databases.

In the scenario illustrated in FIG. 2, flexible ENUM routing node 104 may receive ENUM query 202 including 2.4.3.3.4.3.2.4.3.2.1.e164.arpa corresponding to E.164 number 1-234-234-3342. Upon receiving ENUM query 202, flexible ENUM routing node 104 may first perform a lookup in exception-based data structure 201 for an entry matching 1-234-234-3342. In this example, exception-based data structure 201 includes one entry matching queried address 1-234-234-3342. Accordingly, no further searching need be performed and network address information corresponding to ENUM database 106 may be returned for routing query 202 to ENUM database 106.

Alternately, if a lookup performed in exception-based data structure 201 fails to locate a match, a lookup may be performed in range-based data structure 200 in a manner like that described above with respect to FIG. 1. For example, if ENUM query 202 had included telephone number 1-234-234-2000, then a lookup performed in exception-based data structure 201 would fail to locate a match, and an entry located in the first row of the range data structure would be returned including ENUM1@translate.net and/or 100.98.10.0/port x. After determining the ENUM database identifier associated with the subscriber identifier extracted from ENUM query 202, flexible ENUM routing node 104 may modify and/or forward the ENUM query to ENUM database 106.

Figure 3:
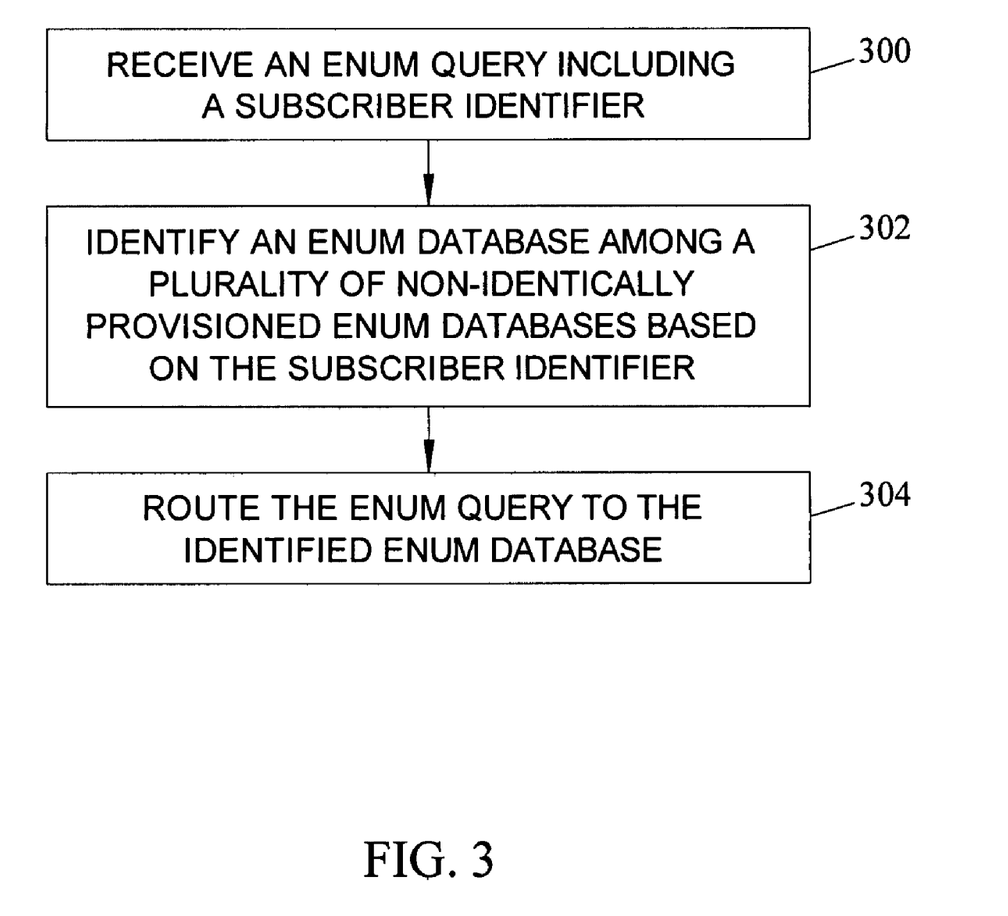
FIG. 3 is a flow chart of an exemplary process for routing ENUM queries to an ENUM database according to an embodiment of the subject matter described herein.

FIG. 3 is a flow chart of an exemplary process for distributing and accessing ENUM data located in multiple ENUM databases according to an embodiment of the subject matter described herein. In block 300, an ENUM query including a subscriber identifier is received. For example, as described above, signaling point 102 may generate ENUM query 114 including an E.164 telephone number and transmit the ENUM query to, or the ENUM query may be intercepted by, flexible ENUM routing node 104.

In block 302, an ENUM database is identified among a plurality of non-identically provisioned ENUM databases based on the subscriber identifier. For example, as illustrated in FIGS. 1 and 2, network 100 may include multiple ENUM databases 106, 108, and 110 containing ENUM data associated with a first set of subscribers, a second set of subscribers, and a third set of subscribers, respectively. The ENUM data stored in databases 106, 108, and 110 may be non-overlapping or partially overlapping. The determination of an ENUM database identifier associated with the E.164 number included in a received ENUM query may be made by searching an E.164-to-ENUM database identifier mapping data structure associating one or more E.164 numbers with one or more ENUM database identifiers.

As described above, E.164-to-ENUM database identifier mapping data structure may include a range-based data structure, a combination of exception-based and range-based data structures, or any other suitable data structure indexed by E.164 numbers. Such a data structure may be implemented using any suitable construct, such as a table, a flat file, a list, an array, a tree, or a trie. As stated above, in FIGS. 1 and 2, E.164-to-ENUM database identifier mapping data structures 112, 200, and 201 include a range-based table and a combination exception-based and range-based table, respectively. Because the E.164-to-ENUM database identifier mapping data structure may be indexed by individual E.164 numbers or by ranges of E.164 numbers, ENUM databases may be added or removed dynamically and ENUM data may be redistributed across ENUM databases so as to provide for more efficient usage of ENUM database storage resources. Moreover, by segmenting ENUM data and storing it across multiple ENUM databases, ENUM service providers may more easily scale with increases in ENUM data volume.

In block 304, the ENUM query is routed to the identified ENUM database. For example, based on ENUM database identifier 100.98.10.0/port x, flexible ENUM routing node 104 may route a received ENUM query to ENUM database 106. According to one embodiment, routing the ENUM query to the appropriate ENUM database may include modifying the ENUM query to include the ENUM database identifier determined in block 302. For example, flexible ENUM routing node 104 may generate modified ENUM query 116 including IP address 100.98.10.0 and port x for delivery to ENUM database 106. It is appreciated that in addition to the exemplary network components shown in FIGS. 1 and 2, additional network components (not shown) may be located between flexible ENUM routing node 104 and one or more of ENUM databases 106-110, where additional network components (not shown) may route ENUM queries to ENUM databases 106-110 according to conventional methods.

Figure 4:
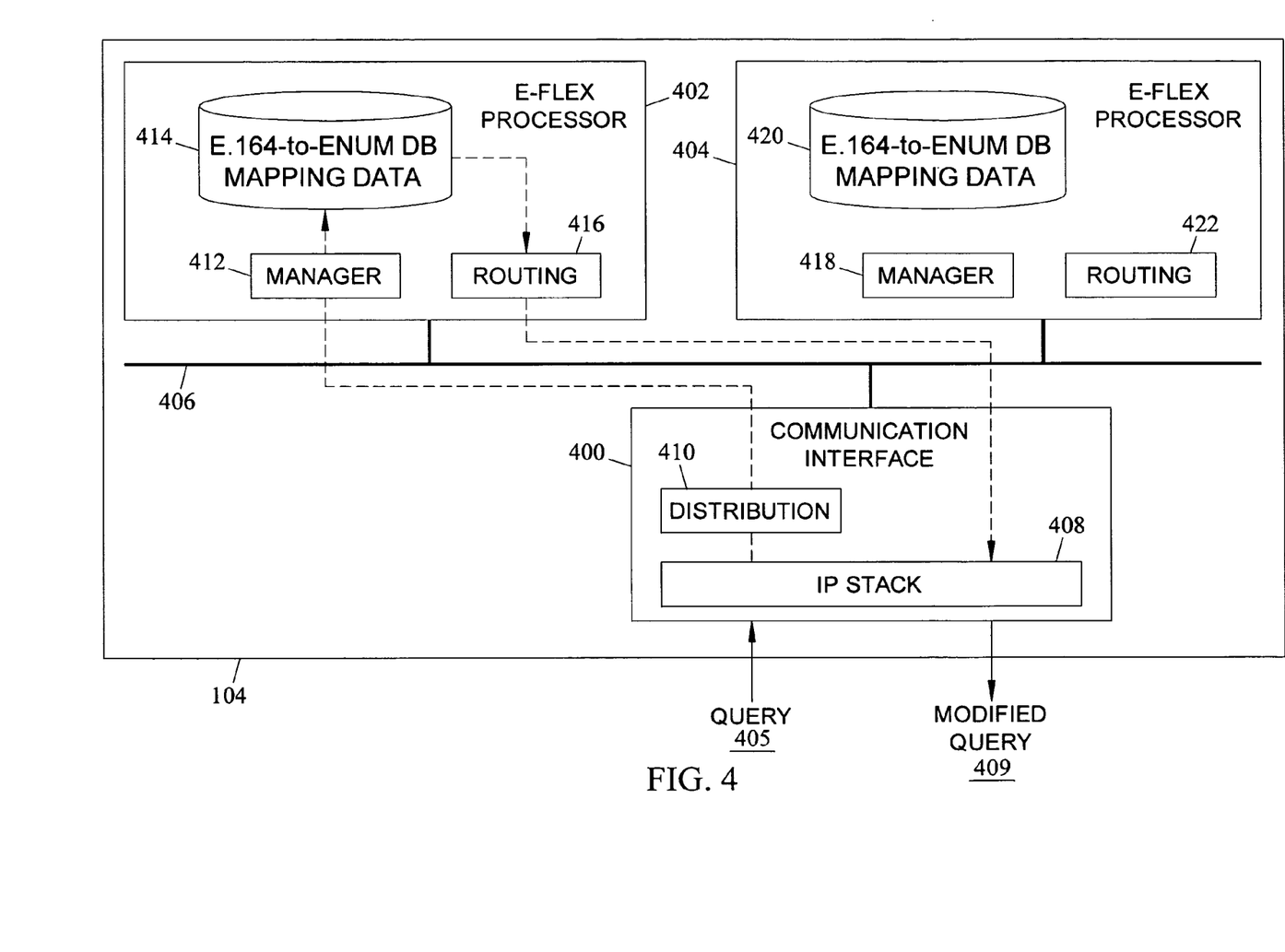
FIG. 4 is a block diagram of an exemplary internal architecture of a flexible ENUM routing node for routing ENUM queries to an ENUM database according to an embodiment of the subject matter described herein.

FIG. 4 is a block diagram of an exemplary internal architecture of a flexible ENUM routing node 104 according to an embodiment of the subject matter described herein. Referring to FIG. 4, exemplary flexible ENUM routing node 104 may include communication module 400 and flexible ENUM processing modules 402 and 404 connected via a bus 406. As illustrated in FIG. 4, it is appreciated that one or more ENUM processing modules may be included in flexible ENUM routing node 104.

It is further appreciated that the components and/or the functionality of flexible ENUM routing node 104 may be implemented in a standalone network element, may be incorporated into an existing network element, or may be distributed across multiple network elements. For example, flexible ENUM routing according to the subject matter described herein may be provided by a signaling gateway node, a network router, an SS7-IP router, an IP router, a SIP server, an IMS node such as a CSCF, a softswitch, an application server, or any other communications network element.

Communication module 400 may include an SS7 or IP stack 408 and a distribution module 410. Stack 408 may be configured to send and receive messages, such as ENUM query and response messages, via a communications network. For example, stack 408 may be connected to an SS7 or IP network and configured to receive ENUM query 405 and send modified ENUM query 409. Distribution module 410 may receive messages from stack 408 and distribute them among ENUM processing modules 402. For example, distribution module 410 may receive ENUM query 405 from stack 408 and send the query to ENUM processing module 402 for processing. In one implementation, ENUM processing modules 402 and 404 may be identically provisioned. As a result, distributions module 410 may load share queries between ENUM processing modules 402 and 404.

ENUM processing module 402 may include an ENUM database identifier function 412, an E.164-to-ENUM database mapping data structure 414, and a routing function 416. ENUM database identifier function 412 may receive ENUM query messages from distribution function 410 via internal communications bus 406 and may extract an E.164 subscriber identifier used to query E.164-to-ENUM database identifier mapping data structure 414. Data structure 414 may be provisioned as a range-based data structure (see FIG. 1), as a combination of range-based and exception-based data structures (see FIG. 2), or as any other suitable data structure for providing access to ENUM database location information. If a matching entry in mapping data structure 414 is located, ENUM database identifier function 412 may modify ENUM query 405 to include the address of the determined ENUM database. The modified ENUM query may then be passed to routing function 416 for delivery to the appropriate ENUM database via stack 408 on communications module 400. For example, routing function 416 may determine on which outbound communication link, socket, SCTP association or other suitable connection the modified query is to be transmitted. ENUM query processing module 404 may be identically provisioned to module 404. However, a description of the corresponding components will not be repeated herein.

Figure 5:
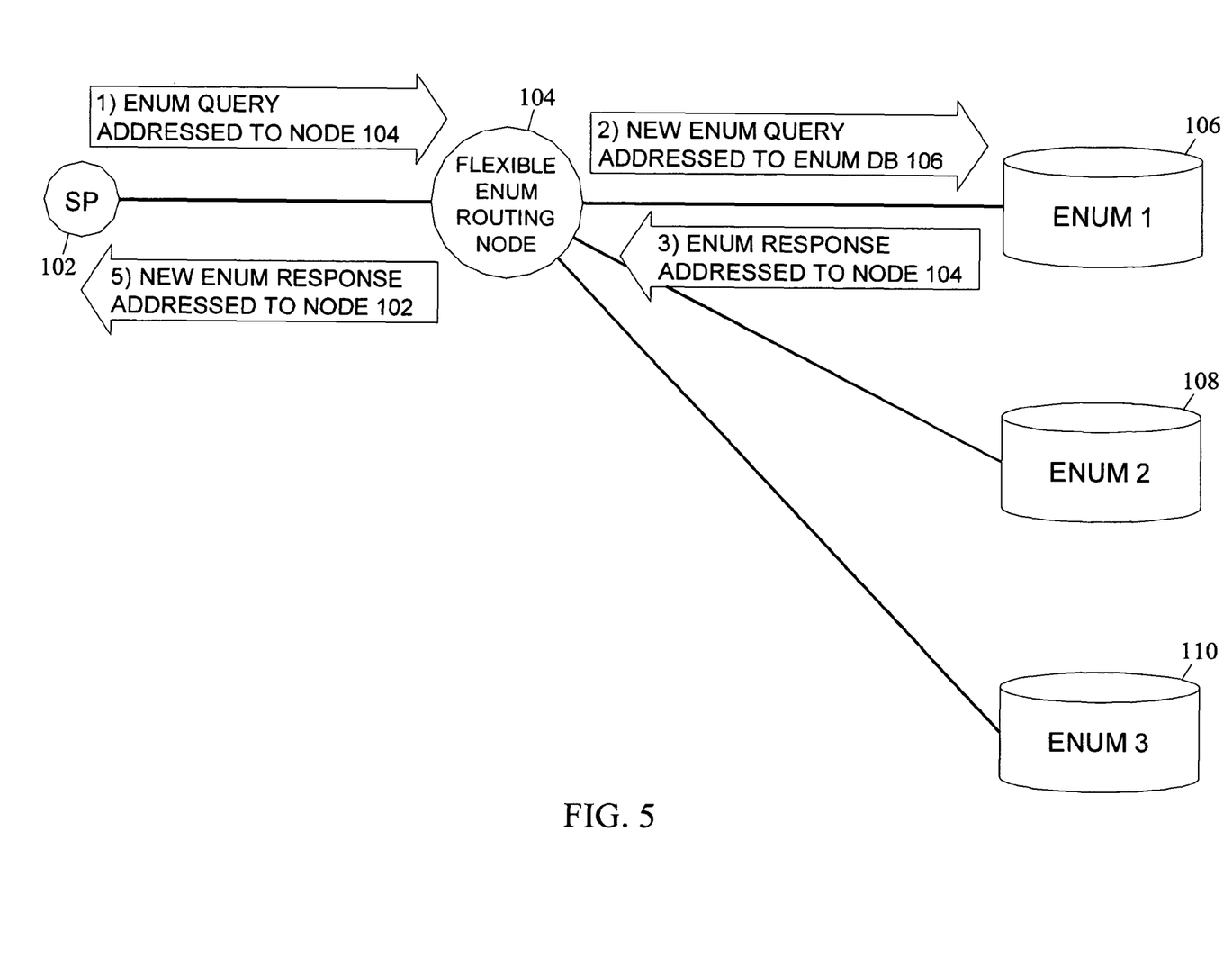
FIG. 5 is a network diagram of an exemplary system for routing ENUM queries to an ENUM database.

In the examples described above, flexible routing node 104 routes ENUM queries to ENUM databases. In alternate implementation, flexible routing node 104 may terminate ENUM queries, store state information relating to ENUM transactions, originate new ENUM queries, process responses, pair responses with queries using stored state information, and forward ENUM responses to query originators. Such an implementation is illustrated in FIG. 5. In FIG. 5, flexible routing node 104 receives an ENUM query from signaling point 102. The ENUM query may be addressed to flexible routing node 104. Flexible routing node 104 identifies the ENUM database to which the query should be routed using any of the methods described above. Rather than routing the original query to the database, flexible routing node 104 sends a new ENUM query to the ENUM database, which in this example is ENUM database 106. Flexible routing node 104 also stores state information indicating that the ENUM query that it sent to database 106 corresponds to a receipt received ENUM query from node 102. This information may be stored on the processing module 402 or 404 to which the original ENUM query was routed. In addition, distribution function 410 may store information that identifies the processing module that processes a particular ENUM query.

When ENUM database 106 responds to the ENUM query from routing node 104, the ENUM response is received by communication interface 400 illustrated in FIG. 4. Distribution function 410 forwards the response to the processing module that originated the ENUM query. That processing module pairs the ENUM response data with the original query, formulates a new response, and routes the response to the query originator, which in this example is SP 102. Accordingly, a flexible ENUM routing node according to the subject matter described herein may have a stateful implementation. Such an implementation, simplifies processing by query originators because the query originators simply forward ENUM queries to flexible routing node 104 and flexible routing node 104 handles the processing with the ENUM databases to obtain the ENUM translation information.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for routing E.164 number mapping (ENUM) queries to an ENUM database, the method comprising:
   receiving an ENUM query including a subscriber identifier;
   identifying an ENUM database among a plurality of non-identically provisioned ENUM databases belonging to the same service provider's network based on the subscriber identifier, wherein each of the ENUM databases contains ENUM data associated with subscribers belonging to the same service provider's network and wherein at least some of the ENUM databases contain ENUM data for different subscribers belonging to the same service provider's network, wherein receiving an ENUM query includes receiving an ENUM query including an E.164 telephone number and wherein identifying an ENUM database includes searching a range-based data structure using the subscriber identifier; and routing the ENUM query to the identified ENUM database.

2. The method of claim 1 wherein receiving an ENUM query includes receiving an ENUM query generated by one of a service switching point (SSP), a mobile switching center (MSC), a media gateway controller (MGC), a session initiation protocol (SIP) proxy server, an H.323 gatekeeper, and an IP multimedia subsystem (IMS) node.

3. The method of claim 1 wherein receiving an ENUM query includes receiving an ENUM query at a flexible ENUM routing node where the query is addressed to the flexible ENUM routing node.

4. The method of claim 1 wherein receiving an ENUM query includes intercepting an ENUM query addressed to an ENUM database.

5. The method of claim 1 wherein identifying an ENUM database includes searching an exception-based data structure and, in response to failing to identify an ENUM database corresponding to the subscriber identifier in the exception-based data structure, searching the range-based data structure.

6. The method of claim 1 wherein identifying an ENUM database includes determining at least one of a uniform resource indicator (URI), an IP address, and a port number associated with the identified ENUM database.

7. The method of claim 1 wherein identifying an ENUM database includes determining a uniform resource indicator (URI) associated with the identified ENUM database.

8. The method of claim 1 wherein routing an ENUM query includes modifying the ENUM query to include the address of the identified ENUM database.

9. A method for processing an E.164 number mapping (ENUM) query, the method comprising:
receiving an ENUM query including a subscriber identifier;
utilizing the subscriber identifier to identify an ENUM database among a plurality of non-identically provisioned ENUM databases belonging to the same service provider's network, wherein each of the ENUM databases contains ENUM data associated with subscribers belonging to the same service provider's network and wherein at least some of the ENUM databases contain ENUM data for different subscribers belonging to the same service provider's network, wherein receiving an ENUM query including a subscriber identifier includes receiving an ENUM query that includes an E.164 telephone number and wherein utilizing the subscriber identifier to identify an ENUM database includes searching a range-based data structure utilizing the subscriber identifier; and
terminating the ENUM query, generating and forwarding a new ENUM query to the identified ENUM database.

10. The method of claim 9 comprising storing state information for an ENUM transaction associated with the ENUM queries.

11. The method of claim 10 comprising:
receiving an ENUM response;
associating the ENUM response with the ENUM transaction using the stored state information;
terminating the ENUM response, generating a new ENUM response, and forwarding the new ENUM response to an originator of the received ENUM query.

12. A flexible ENUM routing node for routing ENUM queries to an ENUM database, the node comprising:
a communications module for receiving an ENUM query including a subscriber identifier;
an E.164-to-ENUM database identifier mapping data structure for associating one or more subscriber identifiers with one or more ENUM database identifiers; and
an ENUM database identifier function for identifying, based on the subscriber identifier and using the E.164-to-ENUM database identifier mapping data structure, an ENUM database from a plurality of non-identically provisioned ENUM databases belonging to the same service provider's network, wherein each of the ENUM databases contains ENUM data associated with subscribers belonging to the same service provider's network and wherein at least some of the ENUM databases contain ENUM data for different subscribers belonging to the same service provider's network, wherein the E.164-to-ENUM database identifier mapping data structure includes a range-based data structure.

13. The flexible ENUM routing node of claim 12 wherein the communications module is configured to receive an ENUM query generated by one of a service switching point (SSP), a mobile switching center (MSC), a media gateway controller (MGC), a session initiation protocol (SIP) proxy server, an H.323 gatekeeper, and an IP multimedia subsystem (IMS) node.

14. The flexible ENUM routing node of claim 12 wherein the communications module is configured to receive an ENUM query addressed to the flexible ENUM routing node.

15. The flexible ENUM routing node of claim 12 wherein the communications module is configured to intercept an ENUM query addressed to one of the ENUM databases.

16. The flexible ENUM routing node of claim 12 wherein the E.164-to-ENUM database identifier mapping data structure includes an exception-based and the range-based data structure and wherein the ENUM database identifier function is adapted to search the exception-based data structure for an entry matching the subscriber identifier, and, in response to failing to locate a matching entry in the exception-based data structure, to search the range-based data structure for an entry matching the subscriber identifier.

17. The flexible ENUM routing node of claim 12 wherein the ENUM database identifier function is configured to determine at least one of a uniform resource indicator (URI), an IP address, and a port number associated with the identified ENUM database.

18. The flexible ENUM routing node of claim 12 wherein the ENUM database identifier function is configured to determine a uniform resource indicator (URI) associated with the identified ENUM database and to perform a domain name system (DNS) query to resolve the URI into an Internet protocol (IP) address.

19. The flexible ENUM routing node of claim 12 wherein the ENUM database identifier function is configured to modify the ENUM query to include an address of the identified ENUM database.

20. A non-transitory computer program product comprising computer executable instructions embodied in a computer readable medium for performing steps comprising:
receiving an ENUM query including a subscriber identifier;
identifying an ENUM database among a plurality of non-identically provisioned ENUM databases belonging to the same service provider's network based on the subscriber identifier, wherein each of the ENUM databases contains ENUM data associated with subscribers belonging to the same service provider's network and wherein at least some of the ENUM databases contain ENUM data for different subscribers belonging to the same service provider's network, wherein receiving an ENUM query including a subscriber identifier includes receiving an ENUM query that includes an E.164 telephone number and wherein identifying an ENUM database includes searching a range-based data structure utilizing the subscriber identifier; and routing the ENUM query to the identified ENUM database.

* * * * *